United States Patent [19]

Maeda et al.

[11] Patent Number: 5,500,945
[45] Date of Patent: Mar. 19, 1996

[54] APPARATUS AND METHOD FOR CONTROLLING A SYSTEM BUS OF A MULTIPROCESSOR SYSTEM

[75] Inventors: Ikuo Maeda; Hirohide Sugahara, both of Kawasaki, Japan

[73] Assignee: Fujitsu Limited, Kawasaki, Japan

[21] Appl. No.: 512,440

[22] Filed: Jul. 31, 1995

Related U.S. Application Data

[63] Continuation of Ser. No. 166,023, Dec. 14, 1993, abandoned.

[30] Foreign Application Priority Data

Dec. 17, 1992 [JP] Japan .................. 4-337646

[51] Int. Cl.⁶ .................. G06F 13/36; G06F 11/00
[52] U.S. Cl. .................. 395/185.09; 395/183.19; 395/182.09; 395/163
[58] Field of Search .................. 395/185.09, 182.09, 395/183.19; 364/240.5; 371/29.5, 8.1, 8.2, 49.3

[56] References Cited

U.S. PATENT DOCUMENTS

| | | | |
|---|---|---|---|
| 4,085,448 | 4/1978 | Kogge | 364/900 |
| 4,453,215 | 6/1984 | Reid | 364/200 |
| 4,621,322 | 11/1986 | Suzuki et al. | 364/200 |
| 4,825,438 | 4/1989 | Bennett et al. | 371/8 |
| 5,146,596 | 9/1992 | Whittaker et al. | 395/725 |
| 5,155,843 | 10/1992 | Stamm et al. | 395/575 |
| 5,423,030 | 6/1995 | Byers et al. | 395/575 |

Primary Examiner—Robert W. Beausoliel, Jr.
Assistant Examiner—Alan M. Fisch
Attorney, Agent, or Firm—Staas & Halsey

[57] ABSTRACT

In a bus arbiter connected to a system bus of a multi-processor system having a plurality of modules respectively having processors, a first unit detects an abnormality in the multi-processor system on the basis of an internal state of the bus arbiter and a predetermined signal transferred via the system bus. A second unit initializes the internal state of the bus arbiter to restart the bus arbiter when the first unit detects an abnormality.

6 Claims, 6 Drawing Sheets

FIG. 4

| STATE | | EXTERNAL CONTROL SIGNALS | | | | | Next STATE | | TRANSITION IN FIG. 5 |
|---|---|---|---|---|---|---|---|---|---|
| | ARBT 012P | INIT | REQ·QR | T-OUT | T-END | TB (HIGH ACTIVE) P 00011 (TB0) E 00101 (TB1) R 01001 R 10001 (TBP) | ARBT 012P | | |
| x | xxx | 1 | | | | | 000 | INIT | ① |
| INIT | 000 | 0 | | | | | 001 | R-WT | ② |
| R-WT | 001 | | 0<br>1 | | | | 001<br>010 | R-WT<br>S-WT | ③ |
| S-WT | 010 | | | 0<br>0<br>1<br>0 | 1<br>0<br>(OR) |    1<br>  1 1<br>1  1 | 100<br>011<br>110<br>101 | CHG<br>E-WT<br>ERR<br>ERR | ④⑥⑤ |
| E-WT | 011 | | | 0<br>0<br>1 | 0<br>1 |   1 1<br>1  1 | 100<br>101 | CHG<br>ERR | ⑦⑧ |
| CHG | 100 | | 1<br>0 | | | | 001<br>010 | S-WT<br>R-WT | ⑨⑩ |
| ERR | 101 | | 1<br>0 | | | | 001<br>010 | S-WT<br>R-WT | ⑨⑩ |

APPARATUS AND METHOD FOR CONTROLLING A SYSTEM BUS OF A MULTIPROCESSOR SYSTEM

This is a continuation, of application Ser. No. 08/166,023, filed Dec. 14, 1993, now abandoned.

BACKGROUND OF THE INVENTION

1. Field of the Invention

The present invention generally relates to system bus control of arbitration between bus requests to use a system bus of a multi-processor system. More particularly, the present invention is concerned with a bus arbiter, a multi-processor system using the same, and a bus control method.

Recently, a data processing system using a multi-processor system has been practically used in order to prevent a system from shutting down and to enable 24-hour operation. In such a system, a bus controller (arbiter) which controls arbitration between bus, requests to use a system bus employs redundant control.

2. Description of the Prior Art

In a conventional concentrated arbitration system, a plurality of processor modules connected to a system bus output external control signals. A bus arbiter, which receives these external control signals, issues a command to one of the processor modules.

Conventionally, if an abnormality occurs, the bus arbiter decodes data transferred via the system and detects the occurrence of abnormality. Then, the bus arbiter stops the operation of the system bus in order to prevent the overall system from being affected by the abnormality. The maintenance operator identifies the abnormality and removes it. Thereafter, the maintenance operator restarts the overall system.

In the above control, the bus arbiter stops the operation of the system bus irrespective of whether or not the abnormality is serious. An example of a serious abnormality is a failure due to breakdown of the hardware in the system. On the other hand, an abnormality, such as a temporary disturbance occurring on the system bus, is not serious. Such a temporary disturbance will occur, for example, if a processor module is added to the system which is operating, or is removed therefrom. Even if an abnormality which is not series occurs, the operation of the system bus is stopped and the maintenance operator restarts the system after the abnormality is identified. Hence, the conventional system does not operate efficiently.

SUMMARY OF THE INVENTION

It is a general object of the present invention to provide a bus arbiter and a multi-processor system in which the above disadvantage is eliminated.

A more specific object of the present invention is to provide a bus arbiter and a multi-processor system capable of automatically restarting the system, which has been stopped in response to detection of an abnormality. If the operation of the system bus is stopped due to an abnormality which is not a serious problem, the system will continue to operate after the operation of the system bus is restarted. If the operation of the system bus is stopped due to a serious abnormality, the operation of the system will be stopped. For example, if a serious abnormality is detected again after the operation of the system bus is restarted, this would cause the system to be stopped. Hence, the efficiency of the system is greatly enhanced.

The above objects of the present invention are achieved by a bus arbiter connected to a system bus of a multi-processor system, wherein a plurality of modules respectively having processors are connected to the system bus. The bus arbiter comprising a first unit for detecting an abnormality in the multi-processor system on the basis of an internal state of the bus arbiter and a predetermined signal transferred via the system bus; and a second unit for initializing the internal state of the bus arbiter to restart the bus arbiter when the first unit detects an abnormality.

The above objects of the present invention are also achieved by a multi-processor system comprising: a bus arbiter; a plurality of modules respectively having processors; and a system bus to which the bus arbiter and the plurality of modules are connected. The bus arbiter comprising first unit for detecting an abnormality in the multi-processor system on the basis of an internal state of the bus arbiter and a predetermined signal transferred via the system bus; and second unit for initializing the internal state of the bus arbiter to restart the bus arbiter when the first unit detects an abnormality.

Another object of the present invention is to provide a bus control method for enhancing the efficiency of multi-processor system.

This object of the present invention is achieved by a method of controlling the system, by utilizing a bus arbiter, a system bus of a multi-processor system, and a plurality of modules respectively having processors being connected to the system bus. The bus control method comprising the steps of: detecting an abnormality in the multi-processor system on the basis of an internal state of the bus arbiter and a predetermined signal transferred via the system bus; and initializing the internal state of the bus arbiter to restart the bus arbiter when an abnormality is detected.

BRIEF DESCRIPTION OF THE DRAWINGS

Other objects, features and advantages of the present invention will become more apparent from the following detailed description when read in conjunction with the accompanying drawings, in which:

FIG. 4 is a diagram showing the operation of the state machine shown in FIG. 3;

DESCRIPTION OF THE EMBODIMENTS

Figure 1:
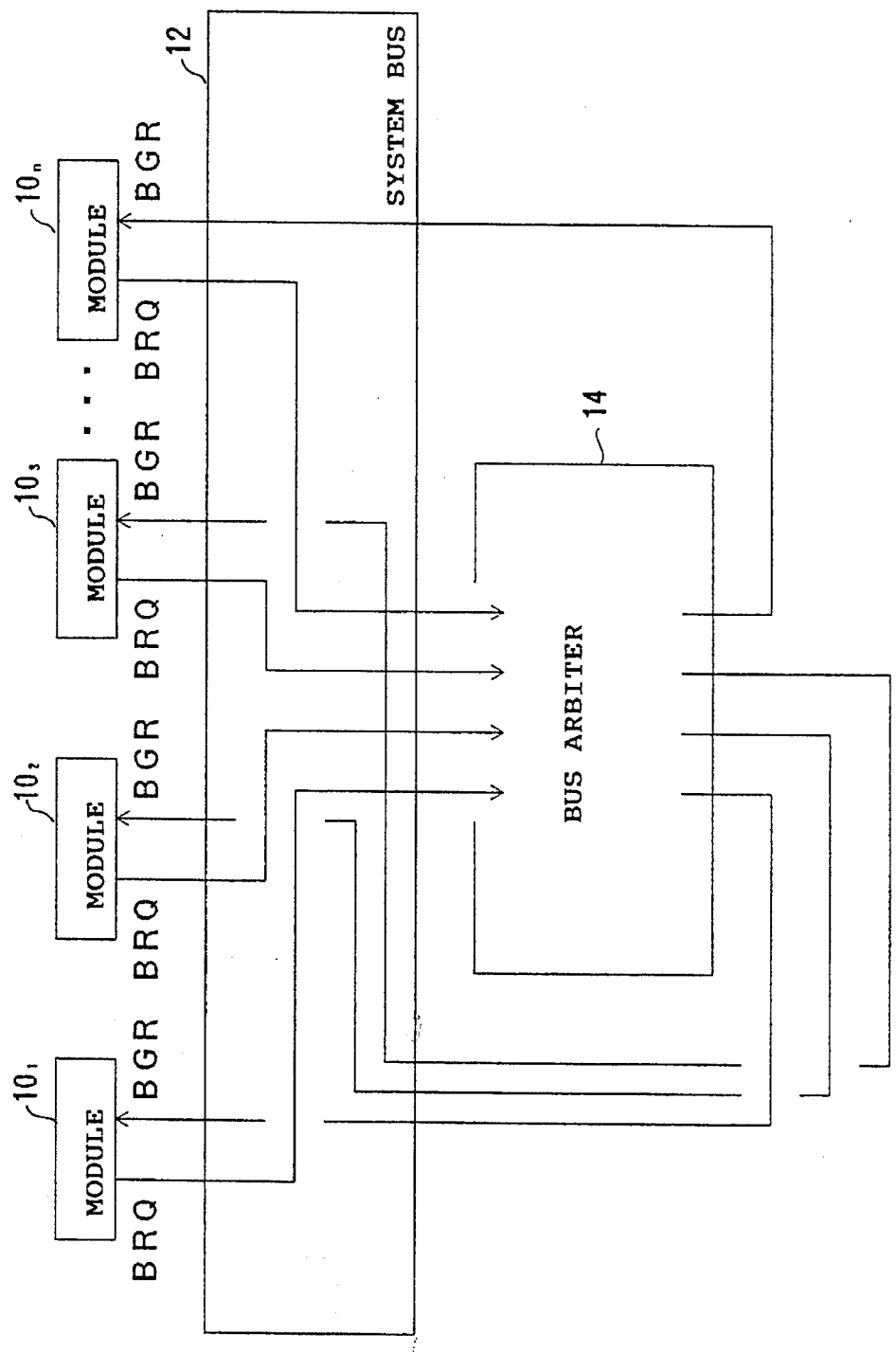
FIG. 1 is a block diagram of a multi-processor system according to first and second embodiments of the present invention.

FIG. 1 is a block diagram of a multi-processor system according to a first embodiment of the present invention. The multi-processor shown in FIG. 1 includes modules $10_1$ through $10_n$ (n is an integer), each of which includes a processor and performs data processing. These modules $10_1$ through $10_n$ are connected to a system bus 12. A bus arbiter 14 for controlling the system bus 12 is connected to the system bus 12.

Each of the modules $10_1$ through $10_n$ outputs a bus request signal BRQ to the bus arbiter 14 via the system bus 12. The bus arbiter 14 outputs to a bus grant signal BGR to one of the modules $10_1$ through $10_n$. The module, which has received the bus grant signal BGR, is allowed to exclusively use the system bus 12.

Figure 2:
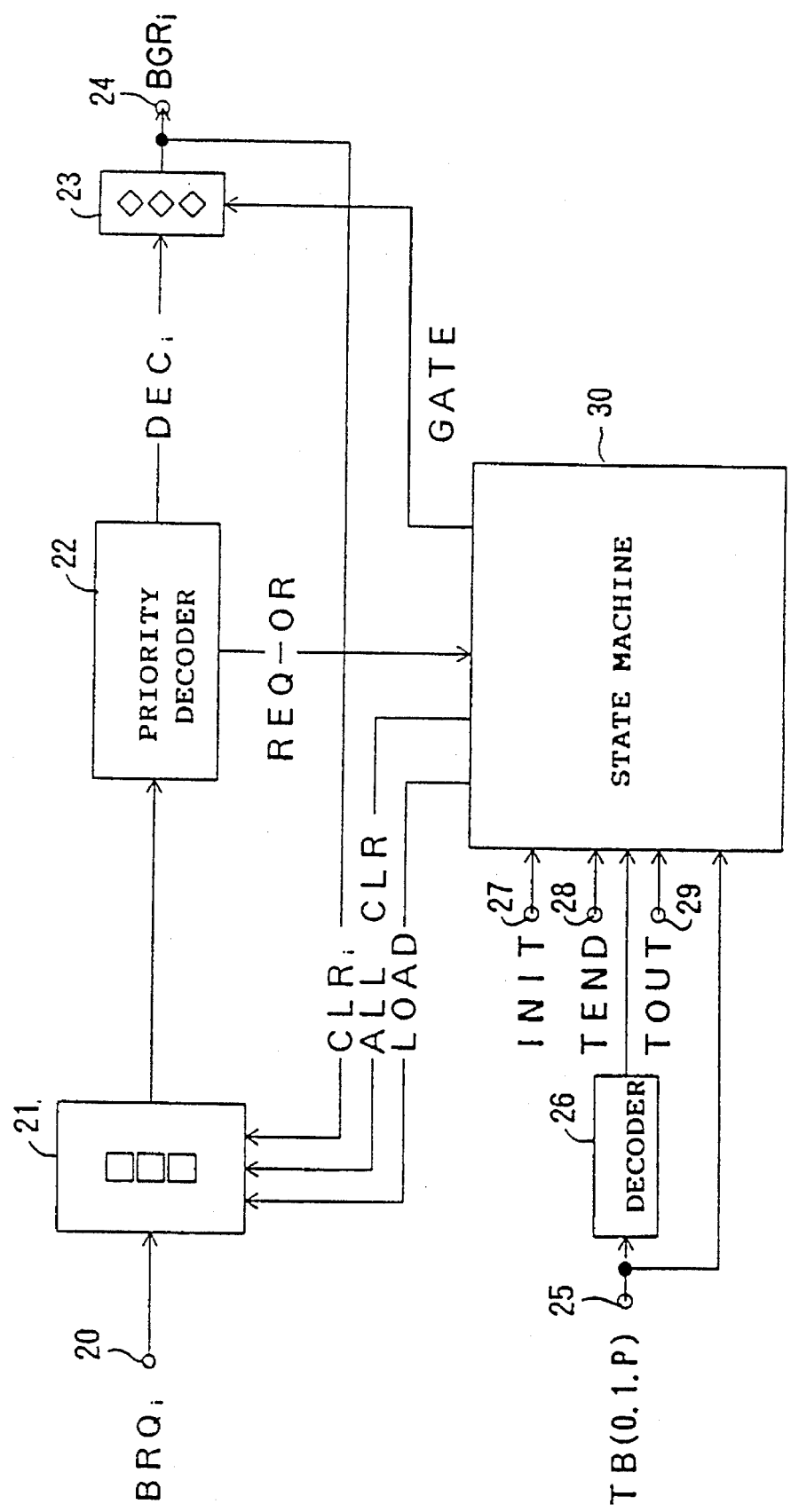
FIG. 2 is a block diagram of a bus arbiter shown in FIG. 1.

FIG. 2 is a block diagram of the bus arbiter 14 shown in FIG. 1. A terminal 20 receives bus request signals BRQi (i is an integer which satisfies $1 \leq i \leq n$) respectively asserted by the modules $10_1$ through $10_n$ and transferred via the system bus 12 in parallel. In response to a load signal LOAD from a state machine 30, a latch circuit 21 latches the bus request signals BRQi in parallel. The bus request signals BRQi latched in the latch circuit 21 are output to a priority decoder 22.

The priority decoder 22 generates, on the basis of priority defined among the modules $10_1$ through $10_n$, signals DECi of n bits, indicating the module having the highest priority among the modules which have asserted the bus request signals BRQi. The generated decoded signals DECi are output to a latch circuit 23 in parallel. Further, the priority decoder 22 performs an OR operation on the bus request signals BRQi of n bits in parallel, and outputs an OR output signal REQ-OR corresponding to the result of the above OR operation to the state machine 30, which is shown in greater detail in FIG. 3. The latch circuit 23 latches the above signals DECi when a gate signal GATE generated by the state machine 30 is received. The latched signals DECi are output, as bus grant signal BGRi, via a terminal 24 in parallel. The bus grant signals BGRi are output to the latch circuit 21 as clear signals CLRi, which clears only the bus request signal BRQi of the latch circuit 21 corresponding to the module to which the asserted bus grant signal BGRi is output. Further, the latch circuit 21 clears the latched signals related to all the modules in response to an all-clear signal ALL CLR generated by the state machine 30.

A tag signal TB consisting of three bits is received via the system bus 12 and a terminal 25. The received tag signal TB is output to a decoder 26. The tag signal TB indicates the leading and trailing portions of data transferred in a multi-word transfer method. More particularly, the tag signal TB includes two-bit tag data (TB0, TB1), and a one-bit odd parity (TBP) added to the two-bit tag data. The first (leading) word of data is indicated by "111" of the tag signal TB. The decoder 26 checks whether or not the odd parity has an error. If it is determined that the odd parity has an error, the decoder 28 has an error signal PERR indicating "1", and decodes the two bits TB0 and TB1 of the three-bit tag signal TB. The decoded signal is output to the state machine 30.

Further, the state machine 30 receives an initializing signal INIT via a terminal 27 connected to the system bus 12, an end signal TEND via a terminal 28 asserted when the data transfer is ended, and an output signal TOUT via a terminal 29 connected to the system bus 12. The output signal TOUT is asserted when the data transfer is not started, though the bus grant signal BGRi has been sent in response to the bus request signal BRQi from one of the modules. The signals INIT, TEND and TOUT are generated in the system bus 12.

Figure 3:
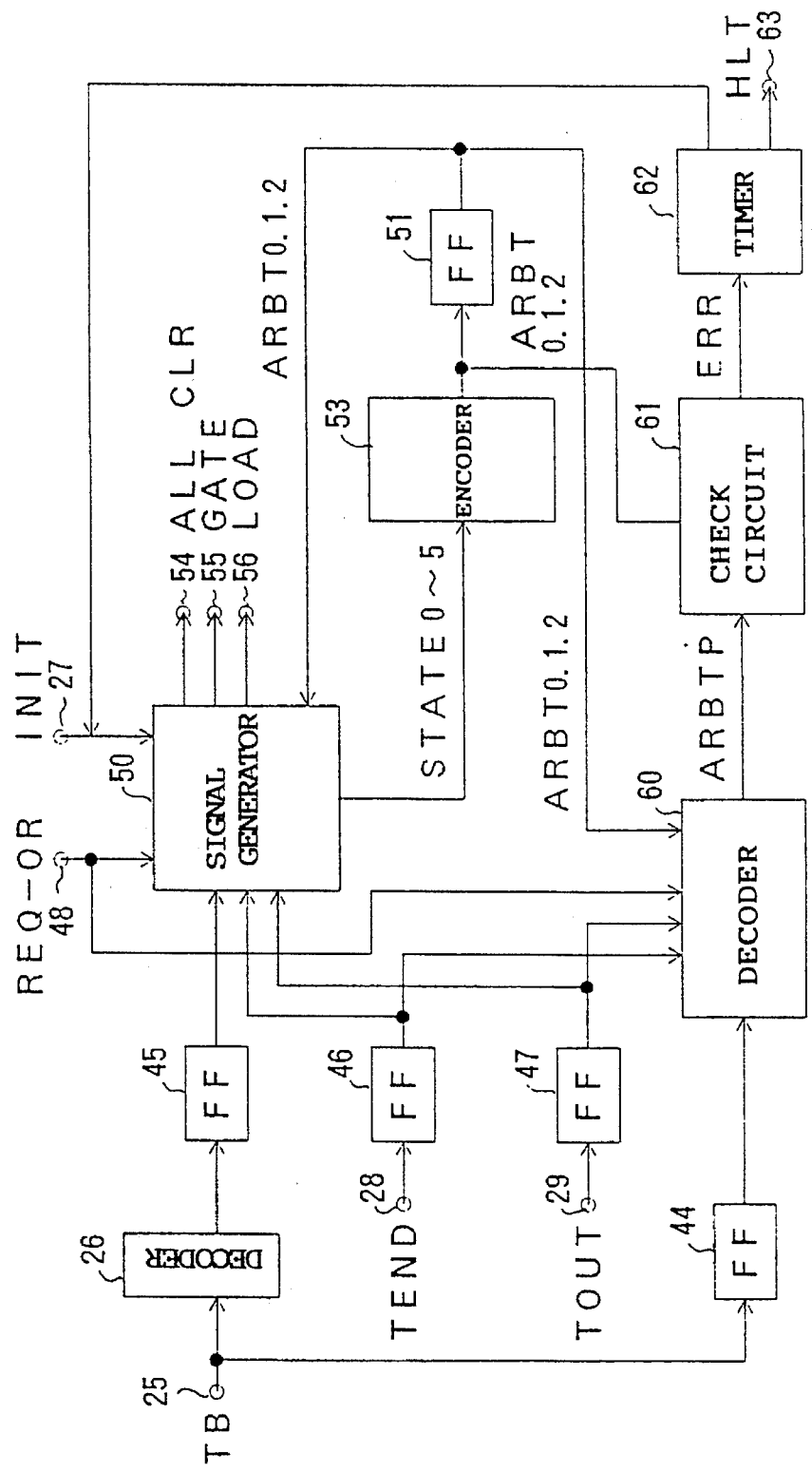
FIG. 3 is a block diagram of a state machine shown in FIG. 2.
Figure 5:
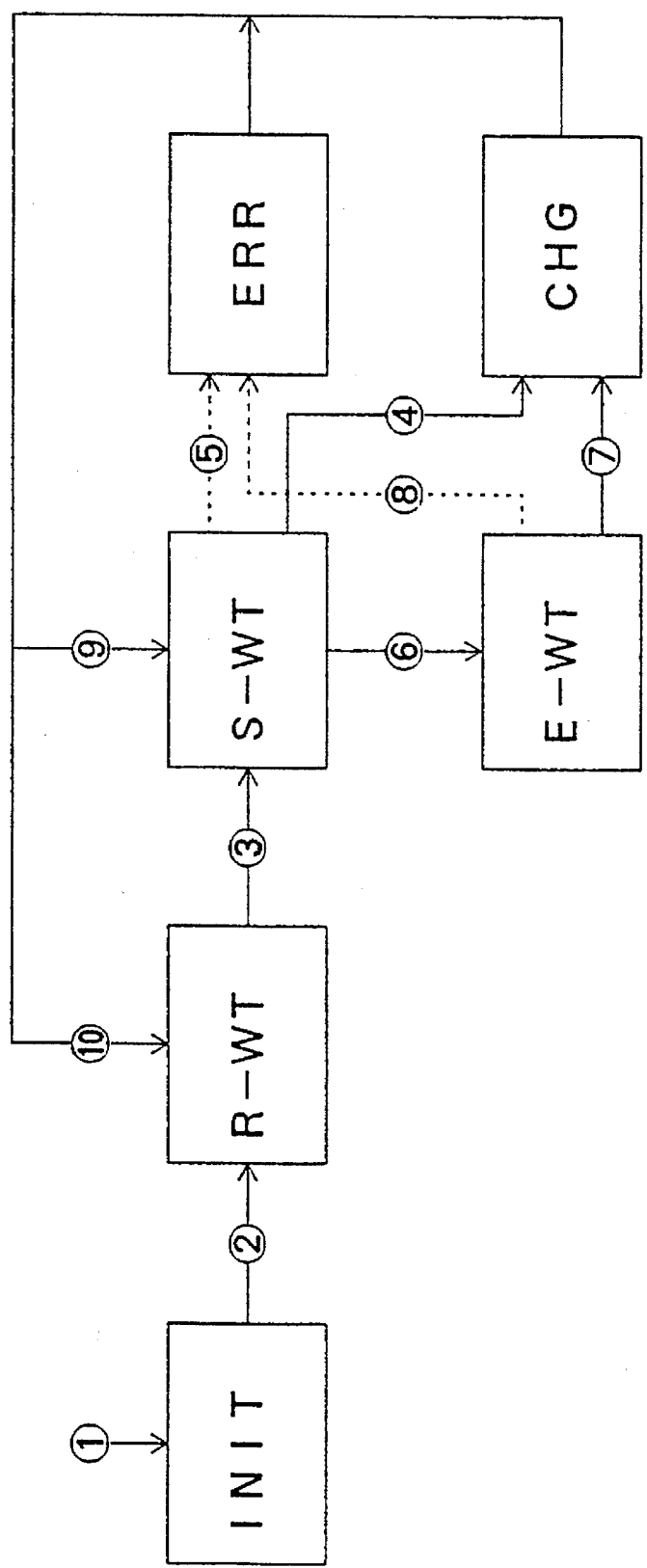
FIG. 5 is a diagram showing the operation of the state machine shown in FIG. 3.

The state machine 30 transfers its state indicated by a state signal including three bits ARBT0, 1 and 2 as shown in FIG. 3. An even parity ARBTP is added to the state information. The state machine 30 has states as shown in FIGS. 4 and 5. When the initializing signal INIT is asserted in an uncertain state (ARBT=XXX), the state of the state machine 30 is switched to an initial state INIT (ARBT=000). Further, when the initializing signal INIT is negated, the state of the state machine 30 is switched to a request waiting state R-WT (ARBT= 001). When the OR operation signal REQ-OR from the priority decoder 22 is asserted in the request waiting state R-WT, the state of the state machine 30 is switched to a first-word waiting state S-WT (ARBT= 010), in which the first word includes a command of transfer data.

When the signal TEND is asserted in the first-word waiting state S-WT and the tag signal TB is equal to 111, the state of the state machine 30 is switched to a module change state CHG (ARBT=100) in which the bus grant signal is supplied from multi-word transfer. When the signal TEND is negated in the first-word waiting state S-WT and the tag signal TB is equal to 111, the state of the state machine 30 is switched to a waiting state E-WT (ARBT=011) in which the state machine 30 waits for an event in which the signal TEND is asserted. When the signal TOUT is asserted in the first-word waiting state S-WT and the tag signal TB is equal to 010 or 100 and when the tag signal TB has a parity error and the signal PERR is equal to 1, the state of the state machine 30 is switched to an error state ERR (ARBT=110 or 101). When the signal TEND is asserted in the state E-WT and the signal PERR is equal to 1, the state of the machine 30 is switched to the state CHG. When the signal TOUT is asserted in the state E-WT and the tag signal TB indicates 001 or 111, the state of the state machine 30 is switched to the state ERR. When the OR operation signal REQ-OR is asserted in the state CHG or ERR, the state of the state machine 30 is switched to the first-word waiting state S-WT. When the signal REQ-OR is negated in the state CHG or ERR, the state of the state machine 30 is switched to the state R-WT.

FIG. 3 is a block diagram of the state machine 30. The tag signal TB received via the terminal 25 is latched in a flip-flop 44. The signal PERR and the decoded output signal from the decoder 26 is latched in a flip-flop 45. The signals TEND and TOUT are respectively latched in flip-flops 46 and 47.

A signal generator 50 receives the decoded signals of the tag signal bits TB0 and TB1 and the signal PERR from the flip-flop 45. Further, the signal generator 50 receives the signals TEND and TOUT from the flip-flops 46 and 47 respectively. Furthermore, the signal generator 50 receives the initializing signal INIT via the terminal 27, the signal REQ-OR from the priority decoder 21 via a terminal 48, and the state signal including the bits ARBT0, 1 and 2 indicating the last state from a flip-flop 51, which will be described later. The signal generator 50 generates information indicating the next possible states (six states such as the state INIT), and generates signals STATE0-5 indicating the above six states. The signals STATE0-5 are output to an encoder 53. Further, the signal generator 50 outputs the signal ALL CLR to a terminal 54 when the signal INIT is received. When the signal REQ-OR is received, the signal generator 50 generates the gate signal GATE. Furthermore, the signal generator 50 periodically generates the signal LOAD via a terminal 56.

The encoder 53 generates the state signal including the bits ARBT0, 1 and 2 indicating the next machine state from the signals STATE0-5 indicating the next state. The bits ARBT0, 1, 2 are stored in the flip-flop 51.

The decoder 60 receives the signals TB, TEND and TOUT from the flip-flops 44, 46 and 47, the signal REQ-OR via the terminal 48, and the bits ARBT0, 1, 2 of the state signal. By using these received signals, the decoder 60 generates the signals ARBT0, 1, 2 indicating the next state, and generates the even parity ARBTP regarding the signals ARBT0, 1, 2. The generated even parity ARBTP is output to a check circuit 61.

The check circuit 61 performs a parity check operation on the state signals ARBT0, 1, 2 from the decoder 53 and the even parity ARBTP from the decoder 60, and asserts the error signal ERR to a timer 62 when a parity error is detected.

The signal generator 50 the signals STATE0-5 indicating the next state from the decoded versions of the tag signals TB0, 1 from the decoder 26. The decoder 60 generates the signals ARBTP0, 1, 2 indicating the next state from the tag signals TB0, 1 from the flip-flop 44, and generates the even parity ARBTP. The signal generator 50 receives the tag signals TB0, 1 and the decoded signals with a timing different from that with which the decoder 60 receives the signals. If a module is connected to or disconnected from the system bus 121 in the state in which the system is operating and hence the system bus 12 is temporarily disturbed, the next state indicated by the signals ARBT0, 1, 2 generated by the signal generator 50 will differ from the next state indicated by the signals ARBT0, 1, 2 generated by the decoder 60. In this case, the check circuit 61 detects a parity error. The check circuit 61 also detects a parity error due to a hardware failure, for example, if the signal generator 50 is broken down.

The timer generates the signal INIT when the error signal ERR is asserted, the signal INIT being output to the signal generator 50. Thereby, the system is caused to the initial state, and is restarted. The timer 62 starts to measure the elapse of time after the error signal ERR is asserted. If the signal ERR is asserted again within a predetermined period measured by the timer 62, the timer 62 outputs a halt signal HLT to the structural elements shown in FIG. 2 via a terminal 63. Thereby, the operation of the bus arbiter 14 is stopped.

If the operation of the bus arbiter 14 is stopped due to an abnormality which is not serious, the signal ERR will not be asserted within the period measured by the timer 62. For example, a module is connected to or disconnected to the system bus 12 in the state in which the system is operating, the system bus 12 will be temporarily disturbed. In this case, the signal ERR will not be asserted again within the period measured by the timer 62. If a serious abnormality has occurred, the signal ERR will be asserted again within the period measured by the timer 62. Hence, it becomes possible to improve the efficiency of the overall multi-processor system.

Figure 6:
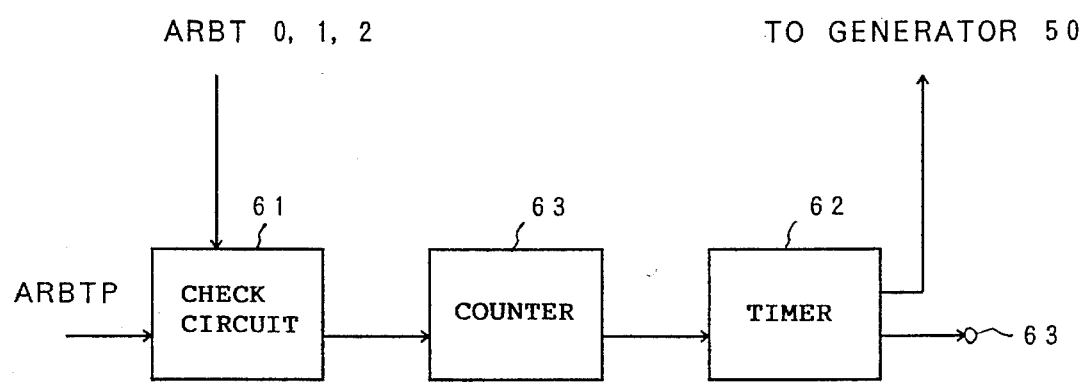
FIG. 6 is a block diagram of a second embodiment of the present invention.

FIG. 6 is a block diagram of an essential part of a second embodiment of the present invention. According to the second embodiment of the present invention, a counter 63 is provided between the check circuit 61 and the timer 62. The counter 63 increments its counter value each time the signal ERR is received. When the signal ERR has been repeatedly received a predetermined number of times, the counter 63 outputs a signal to the timer 62.

In the above-mentioned first and second embodiments of the present invention, the halt signal HLT is used to immediately stop the operation of the system bus. Alternatively, it is possible to perform a logic operation on the halt signal HLT and other signals and stop the overall operation of the system on the basis of the result of the above logic operation.

The present invention is not limited to the specifically disclosed embodiments, and variations and modifications may be made without departing from the scope of the present invention.

What is claimed is:

1. A bus arbiter connected to a system bus of a multi-processor system, a plurality of modules respectively having processors being connected to the system bus, said bus arbiter comprising:

first means for detecting an abnormality in the multi-processor system on the basis of an internal state of the bus arbiter and a predetermined signal transferred via the system bus;

second means for initializing the internal state of the bus arbiter to restart the bus arbiter when said first means detects the abnormality; and third means for determining whether or not said first means detects another abnormality within a period of time after said first means detects the abnormality and for stopping an operation of the system bus when said first means detects said another abnormality within the period of time.

2. The bus arbiter as claimed in claim 1, wherein said first means comprises:

means for performing a first parity check operation on the predetermined signal transferred via the system bus and a second parity check operation on information regarding the internal state of the bus arbiter; and means for detecting the abnormality by comparing the result of the first parity check operation with the result of the second parity check operation.

3. A multi-processor system comprising:

a bus arbiter;

a plurality of modules respectively having processors; and a system bus to which said bus arbiter and said plurality of modules are connected, said bus arbiter comprising:

first means for determining an abnormality in the multi-processor system on the basis of an internal state of the bus arbiter and a predetermined signal transferred via the system bus;

second means for initializing the internal state of the bus arbiter to restart the bus arbiter when said first means detects the abnormality; and third means for determining whether or not said first means detects another abnormality within a period of time after said first means detects the abnormality and for stopping an operation of the system bus when said first means detects said another abnormality within the period of time.

4. The multi-processor system as claimed in claim 3, wherein said first means comprises;

means for performing a first parity check operation on the predetermined signal transferred via the system bus and a second parity check operation on information regarding the internal state of the bus arbiter; and means for detecting an abnormality by comparing the result of the first parity check operation with the result of the second parity check operation.

5. A method of controlling, by means of a bus arbiter, a system bus of a multi-processor system and a plurality of modules respectively having processors being connected to the system bus, said method comprising the steps of:

detecting an abnormality in the multi-processor system on the basis of an internal state of the bus arbiter and a predetermined signal transferred via the system bus;

initializing the internal state of the bus arbiter to restart the bus arbiter when the abnormality is detected;

determining whether or not another abnormality is detected within a period of time after the abnormality is detected;

stopping an operation of the system bus when said another abnormality is detected within the period of time.

6. The method as claimed in claim 5, wherein said step of detecting comprises the steps of:

performing a first parity check operation on the predetermined signal transferred via the system bus and a second parity check operation on information regarding the internal state of the bus arbiter; and detecting the abnormality by comparing the result of the first parity check operation with the result of the second parity check operation.

* * * * *

UNITED STATES PATENT AND TRADEMARK OFFICE
CERTIFICATE OF CORRECTION

PATENT NO. : 5,500,945
DATED : March 19, 1996
INVENTOR(S) : Ikuo MAEDA, et al.

It is certified that error appears in the above-indentified patent and that said Letters Patent is hereby corrected as shown below:

Col. 1, line 20, after "(arbiter)" insert --,--;
line 21, delete "," after "bus" (first occurrence); and insert --,-- after "bus" (second occurrence);
line 44, after "system" insert --,--;

Col. 2, line 7, change "comprising" to --comprises--;
lines 17-18, "change "comprising" to --comprises--;
line 26, after "of" insert --the--.

Col. 6, line 51, change ";" to --:--.

Signed and Sealed this

Ninth Day of July, 1996

Attest:

BRUCE LEHMAN

Attesting Officer     Commissioner of Patents and Trademarks